(12) United States Patent
Nazri

(10) Patent No.: US 6,294,142 B1
(45) Date of Patent: Sep. 25, 2001

(54) HYDROGEN STORAGE SYSTEMS AND METHOD OF MAKING THEM

(75) Inventor: Gholam-Abbas Nazri, Bloomfield Hills, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/336,250

(22) Filed: Jun. 18, 1999

(51) Int. Cl.$^7$ .................................................. C01B 31/04
(52) U.S. Cl. ........................... 423/275; 423/448; 423/460
(58) Field of Search ................................. 423/439, 448, 423/275, 460; 95/116; 429/231.4

(56) References Cited

U.S. PATENT DOCUMENTS

| | | | |
|---|---|---|---|
| 3,278,632 | * 10/1966 | Wambling et al. | 423/439 |
| 4,580,404 | * 4/1986 | Pez et al. | 96/146 |
| 5,653,951 | 8/1997 | Rodriguez et al. | 423/439 |
| 5,698,140 | 12/1997 | Lamb et al. | 252/502 |

OTHER PUBLICATIONS

Chen et al, "High $H_2$ Uptake by Alkali–Doped Carbon Nanotubes under Ambient Pressure and Moderate Temperatures", *Science*, vol. 285, Jul. 2, 1999, pp. 91–93.

* cited by examiner

*Primary Examiner*—Stuart L. Hendrickson
(74) *Attorney, Agent, or Firm*—George A. Grove; Cary W. Brooks

(57) ABSTRACT

A hydrogen fuel storage composition is prepared by mixing and reacting, on an atomic proportion basis, one part of an alkali metal selected form the group of lithium, sodium or potassium with eight to 24 parts of carbon under conditions of temperature and pressure such that a fully-reacted alkali metal intercalated graphitic carbon composite is formed. When suitably prepared, such a composite can reversibly absorb ten percent or more of its weight of hydrogen gas.

4 Claims, 3 Drawing Sheets

HYDROGEN STORAGE SYSTEMS AND METHOD OF MAKING THEM

TECHNICAL FIELD

This invention pertains to graphite or carbon and alkali metal compositions for the reversible storage of hydrogen gas and to methods for making such compositions.

BACKGROUND OF THE INVENTION

Hydrogen is a very energetic, clean burning fuel. It can be burned with great energy release in air or oxygen-enriched atmosphere to yield water without unburned hydrocarbons or carbon oxides as byproducts. The problem, of course, is that it is difficult to store hydrogen for mobile applications such as automobiles or trucks. Hydrogen can be stored as a liquid only if it can be kept very cold and under high pressure. If hydrogen is to be stored as a gas, most previous approaches have been to use metal containers suitable for confining the gas under very high pressures. There are no practical materials that can reversibly absorb or adsorb appreciable amounts of hydrogen at low pressure and give it up as a gas on demand. Accordingly, hydrogen has not been available as a practical fuel in vehicular applications.

There is a need to advance the art of hydrogen storage materials that can take up and temporarily hold substantial quantities of hydrogen at relatively low pressure and give up gaseous hydrogen on demand.

SUMMARY OF THE INVENTION

This invention provides a fully reacted alkali metal intercalated graphite or non-graphitic carbon that is capable of reversibly absorbing unusually large amounts of hydrogen gas. It is preferred to use graphite. One use of such material is as a temporary storage device for hydrogen fuel in connection with engines and fuel cells. Another use for the material is as a separation device to remove hydrogen from a mixture of gases.

One aspect of the invention is a method of forming a fully reacted alkali metal-graphite combination that has substantial hydrogen-adsorbing capabilities. The method suitably utilizes ordinary graphite or non-graphitic carbon and one or more alkali metals selected from the group consisting of lithium, sodium and potassium. Graphite, of course, is a crystalline form of carbon in which the carbon atoms lie in planes in $C_6$ hexagonal cells.

In accordance with the method, a mixture of six to 24 atomic parts of carbon (graphite) and one atomic part of alkali metal is formed. Due to the presence of the readily oxidized metal, the mixture is prepared under a substantially non-oxidizing atmosphere, suitably an argon atmosphere. The dry solid mixture is then vigorously compacted, for example in a die or mold, and heated to promote substantially complete intercalation of the alkali metal atoms between the graphene planes. When lithium is the alkali metal, it is preferred that the reactants be mixed in proportions of six to twelve atoms of carbon per atom of lithium. For sodium, the preferred ratio is eight to twelve carbon atoms per sodium atom, and for potassium the atomic ratio is eight to 24 carbon atoms. When mixtures of metals are used, the ratios are modified in proportion to the amounts of the respective metals.

In these proportions and under suitable conditions of pressure and temperature, the starting materials are fully altered to a binary intercalated structure. For example, an x-ray diffraction analysis of the product will normally contain none of the diffraction peaks of graphite or the alkali metal but will display a diffraction pattern characteristic of an alkali metal intercalated carbon composite suitable for the practice of this invention.

In a preferred embodiment of the invention, the graphite or non-graphitic carbon is pre-reacted with a small (less than specified amount) of the intended alkali metal. A precursor material is made using, for example, about 30 atomic parts of graphite per part of alkali metal. The precursor is suitably made using the same reaction conditions as for the final intercalated product. The formation of the precursor seems to initially exfoliate the graphite planes to better prepare the precursor for further intercalation with the alkali metal to achieve the specified composition for hydrogen storage.

The fully-reacted molded composite is usually initially in the form of a molded body. It can be used in the form of a molded body or comminuted to particles of a desired size. But a first surprising characteristic of the material is its capacity to take up hydrogen gas.

When a quantity of potassium-intercalated graphite is placed in a closed container with hydrogen gas at, e.g., 10 pounds per square inch gage (psig) and 150° C., the pressure in the vessel drops. If the amount of hydrogen is not sufficient to saturate the metal-graphite composite, the pressure falls below atmospheric pressure. The weight of the material increases, for example, by more than one-tenth to one-third of its original weight. The hydrogen absorption of the material is largely reversible.

Upon heating, a material with stored hydrogen releases hydrogen gas. Indeed, hydrogen intake or release can be cyclically induced by temperature or pressure change. In general, by decreasing the temperature or increasing hydrogen partial pressure, hydrogen absorption is increased. Conversely, by increasing temperature or decreasing hydrogen pressure, the hydrogen loading of the metal-graphite composite is decreased.

Obviously, the alkali metal-intercalated graphite material of this invention can be used to temporarily store hydrogen fuel for engines, fuel cells and the like. It can also be used in other hydrogen storage applications or in hydrogen separation applications.

There is an additional surprising feature of the binary material produced in accordance with this invention. It is found that when the lithium, sodium and/or potassium intercalated graphite of this invention is loaded with hydrogen, the resultant ternary material (of metal, graphite and hydrogen origin) has very interesting magnetic and electrical conductivity properties. By varying the hydrogen content of the ternary material, one "tunes" the electrical conductivity and magnetic properties as the material functions within the metal-insulator electron energy gap.

It is believed, without intending to limit the invention in any way, that the unexpected hydrogen storage capacity is related to nature of the electrons in the binary structure and resulting metal-graphite hydrogen ternary. The electrons are of mobile π character in the binary. As the hydrogen is absorbed, its valence electron partially escapes into the π electron environment. The effective volume of the hydrogen is decreased and the capacity of the binary composite for hydrogen is increased. Further, the combination of the hydrogen valence electrons with the π electrons of the binary contribute to the new electronic and magnetic properties of the metal-graphite-hydrogen ternary.

Other objects and advantages of this invention will become more apparent from a detailed description of preferred embodiments which follows. Reference will be had to the drawings that are described in the following section.

DESCRIPTION OF PREFERRED EMBODIMENTS

In this work, low cost graphite flakes or powder, graphite fibers and non-graphitic carbons have been used to prepare hydrogen-absorbing, carbon compounds. The process includes careful intercalation of alkali metals into a preconditioned graphite structure. The process developed in this work is applicable to most common graphitic materials and to non-graphitic carbons.

EXAMPLE 1
Preparation of Potassium Intercalated Graphite Samples

Twenty grams of graphite particulates with average particle size of five microns were mixed with two grams of elemental potassium and heat treated under argon atmosphere at 150° C. for eight hours under 5 tons/cm² pressure. The sample was cooled to ambient temperature and ground to fine powder. The mixture was heat treated for the second time at 150° C. for eight hours and cooled to ambient temperature.

The above sample was reacted with pure methanol in an inert environment. The methanol was added to the sample drop by drop until no gassing was observed. The sample was washed with excess methanol and filtered. This step removed any unreacted potassium from the partially potassium intercalated graphite material. The nominal composition of this precursor material was about $KC_{32+}$. The partially intercalated precursor material was dried at 150° C. under vacuum ($10^{-3}$ torr) in argon atmosphere for eight hours. The sample was used for preparation of a hydrogen dense absorbing potassium-graphite composition.

Ten grams of the above potassium-graphite precursor material were used to make two compacted discs for further potassium intercalation. The discs were made at 5 tons/cm² pressure inside a dry box filled with argon. Four grams of potassium was sandwiched between the two potassium-graphite precursor discs and heat treated at 150° C. under 5 tons/cm² pressure in argon atmosphere for eight hours. The sample was cooled to ambient temperature and ground to fine powder. The powder was compacted under 5 tons/cm² and heat treated for a second time at 150° C. for eight hours. The sample was cooled to ambient temperature and stored for hydrogen uptake and release tests.

The composition of the final sample was determined to be close to $KC_8$.

Pressure Test 1.5 grams of the above $KC_8$, potassium intercalated graphite composition was placed inside a stainless steel bomb for hydrogen uptake—hydrogen release test. The volume of the stainless steel bomb was about 800 ml. The bomb was connected to a one-liter reservoir tank. After the sample was placed in the bomb under argon atmosphere, the bomb and the reservoir were evacuated to $10^{-3}$ torr. The bomb and the reservoir then were pressurized with a fixed quantity of hydrogen to about 10 psig. The sample temperature was ramped to 150° C. and held at that temperature. The pressure of the reservoir tank was monitored as a function of time during heating and isotherm.

Figure 1:
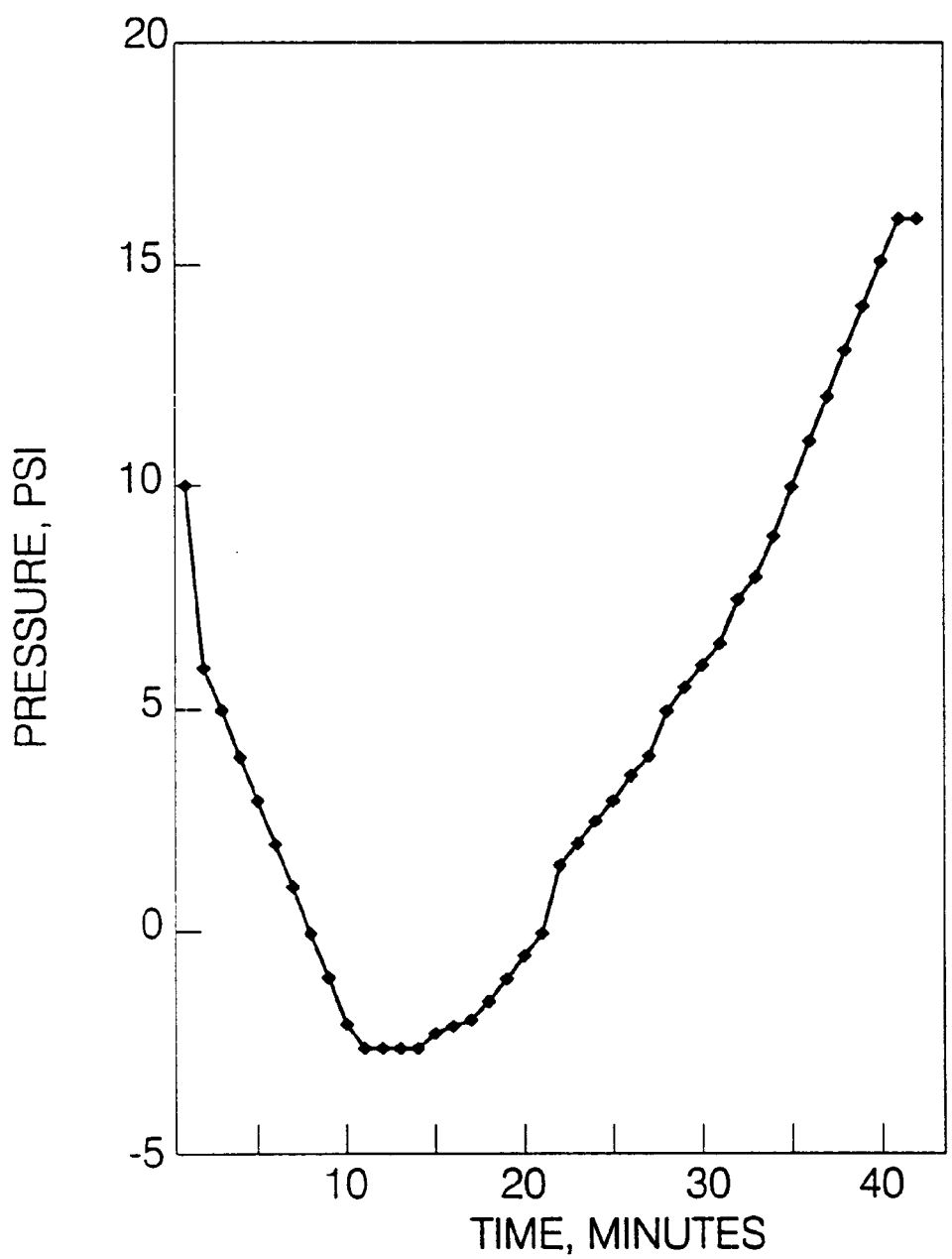
FIG. 1 is a graph of gage pressure, in pounds per square inch, versus time, in minutes, for a sample (Example 1) of a potassium intercalated graphite composition, $KC_8$. The sample was contacted with a fixed amount of hydrogen, first at 150° C. and then at increasing temperatures to 300° C.

A continuous pressure drop from 10 psig was observed as a stable vacuum was developed. As shown in FIG. 1, the pressure steadily dropped over a period of ten to eleven minutes until the pressure of hydrogen in the system was a few pounds per square inch below atmospheric pressure. The potassium intercalated graphite sample had absorbed hydrogen from the bomb and reservoir creating a vacuum in the bomb-reservoir system. The temperature of the sample was then ramped to 300° C. As the temperature in the system increased, the sample released its hydrogen and the pressure increased to more than 15 psig. This cycle of hydrogen adsorption and desorption is reversible.

Thermogravimetric Test

Hydrogen uptake and release of the $KC_8$, potassium intercalated graphite sample was measured quantitatively by thermogravimetric analysis. In this test, about 45 mg of the potassium intercalated graphite composition was loaded in a TGA system, which had been purged previously with argon. Then the sample was purged under continuous flow of hydrogen gas while its temperature was ramped to 300° C. at 10 degrees/min. The weight of the sample was monitored at 300° C. The test was continued as the temperature of the sample was cycled between 50° C. and 300° C. (at 10 degrees/min). The weight gain and weight loss of the sample vs. temperature is shown in FIG. 2.

Figure 2:
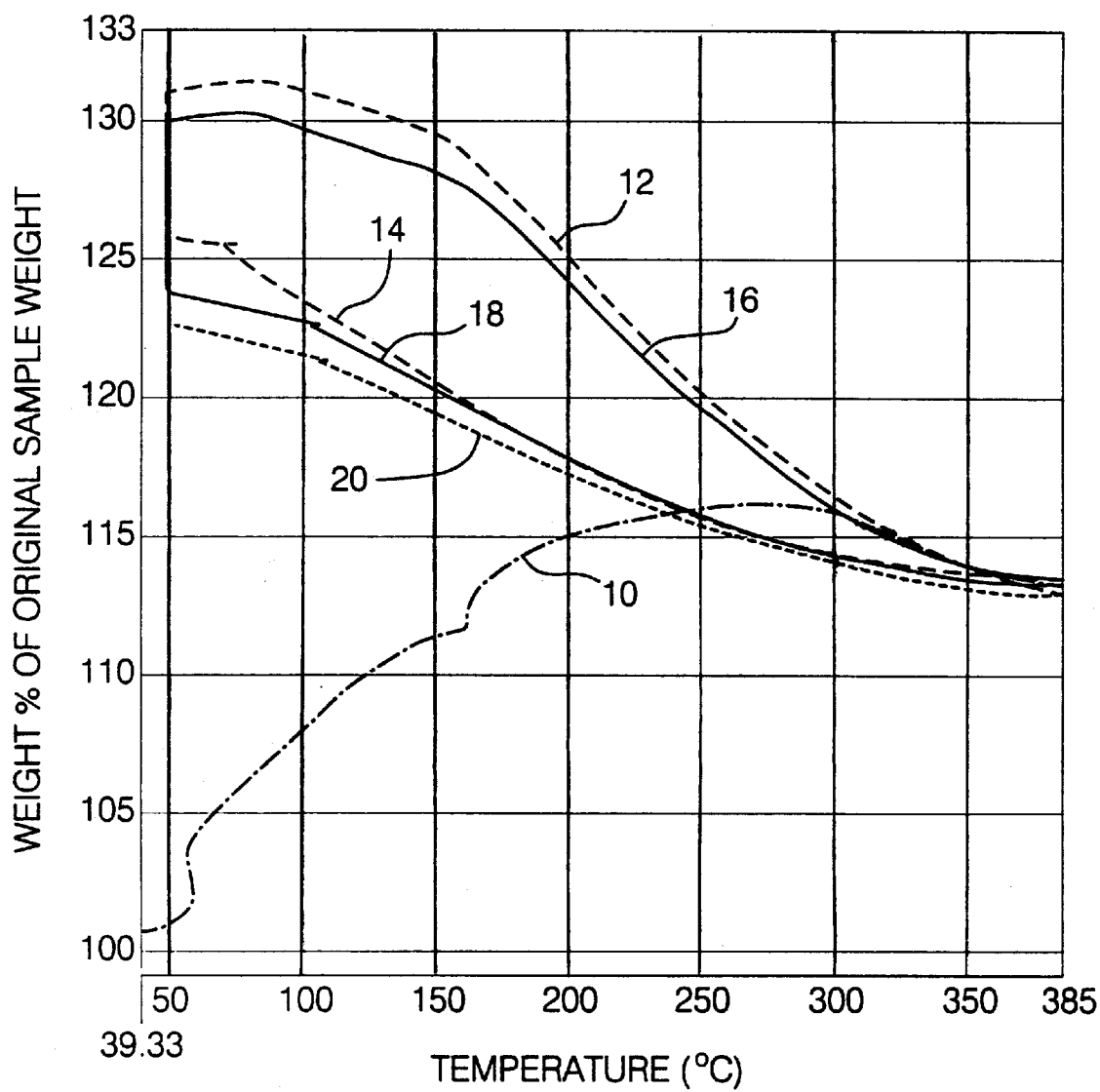
FIG. 2 is a thermogravimetric analysis (TGA) plot of the Example 1 sample in flowing hydrogen.
Figure 3:
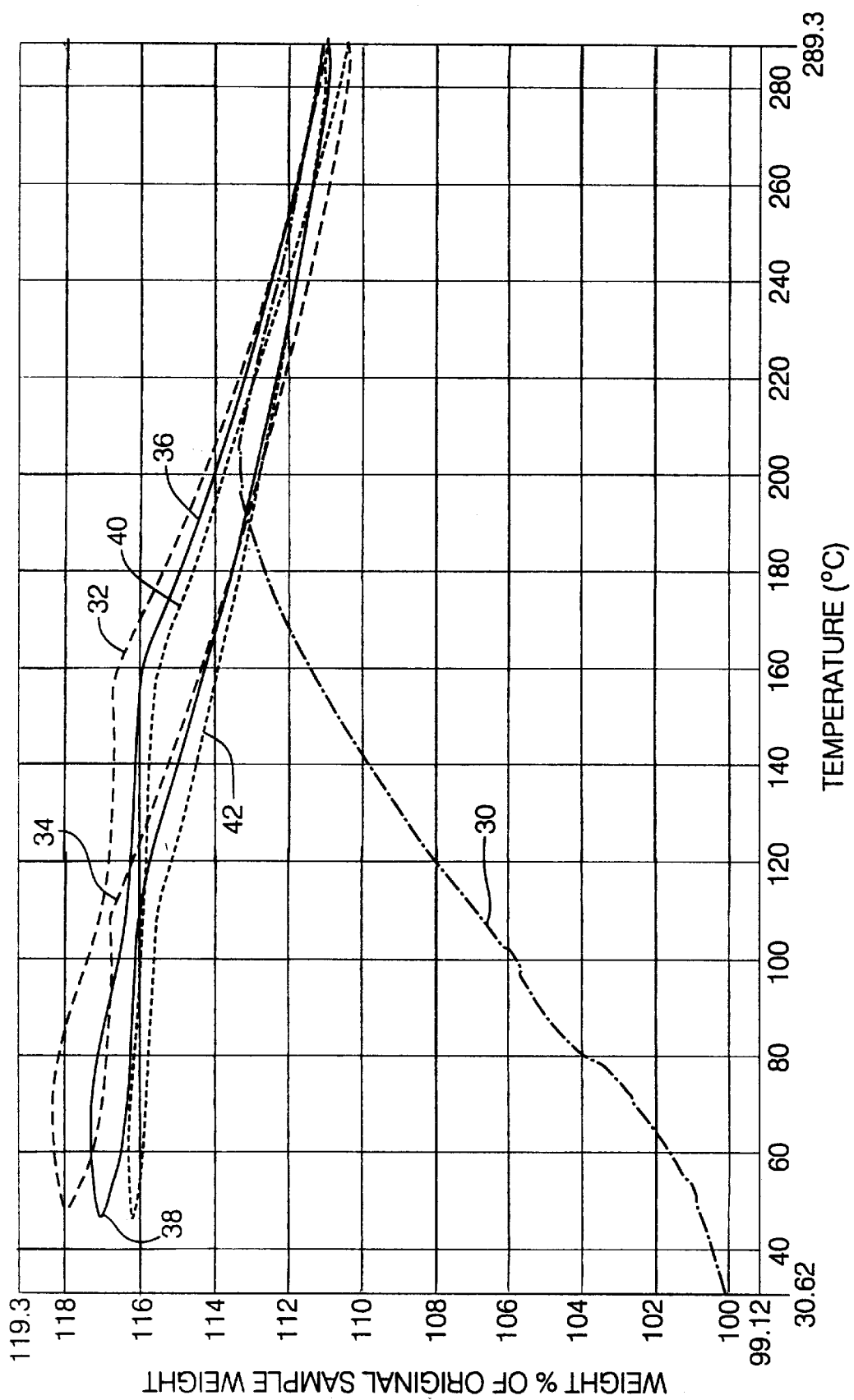
FIG. 3 is a thermogravimetric analysis (TGA) plot of the Example 3 sample in flowing hydrogen.

It is seen in FIG. 2 that the $KC_8$ sample weight increased steadily to a maximum value of about 117% of its original weight in the flowing hydrogen stream as the temperature first increased (curve 10) to about 280° C. The weight of the absorbed hydrogen then decreased as the temperature was further increased to 385° C. When the temperature was decreased at a rate of ten degrees per minute (curve 12), the weight of the sample plus hydrogen increased further to about 131% of the original sample weight at about 50° C. Upon heating again (curve 14), the sample released hydrogen to about 113% of the original sample weight. A second cooling (curve 16) and re-heating (curve 18) as well as a third cooling (curve 20) produced similar hydrogen storage and release cycles. Thus, it is seen that the potassium intercalated graphite sample of $KC_8$ composition repeatedly adsorbed up to about 33% of its weight of hydrogen and released about 20% of its weight of hydrogen in these heating and cooling cycles in flowing hydrogen at ambient pressure.

EXAMPLE 2
Preparation of Potassium Intercalated Carbon Samples

Twenty grams of graphite fiber (fiber diameter close to 1 micron) was mixed with 2 grams of potassium and heat treated at 150° C. for eight hours under 5 tons/cm² pressure. The sample was cooled to ambient temperature and ground to fine powder, and heat treated again at 150° C. for eight hours. This sample was cooled down to room temperature. Methanol was added to the sample until no further gassing was observed. The sample was rinsed with excess methanol, filtered and dried under vacuum ($10^{-3}$ torr) in argon atmosphere at 150° C. for eight hours.

The nominal composition of this precursor material was about $KC_{32+}$. The sample was used for preparation of a hydrogen dense absorbing potassium-graphite composition.

From the precursor material two compacted discs, each weighing about five grams, were formed under 5 tons/cm² pressure. Four grams of potassium was sandwiched between the compacted discs under the same multi-ton pressure as above and heated under argon at 150° C. for eight hours. The sample was cooled to ambient temperature and ground to fine powder. The powder was heat treated for the second time under pressure at 150° C. for eight hours under argon gas.

The composition of the potassium intercalated carbon was $KC_8$. After cooling the sample to ambient temperature, the sample was used for reversible hydrogen uptake and release tests with substantially the same results as presented in FIGS. 1 and 2 for the Example 1 material made from non-fibrous graphite.

EXAMPLE 3

A potassium intercalated graphite precursor material was prepared as described in Example 1.

Ten grams of the above potassium intercalated graphite precursor samples were used to make two compacted discs. Two grams of potassium were sandwiched between the two discs and reacted according to the procedure described in Example 1. At completion of the reaction process, the composition of this sample was close to $KC_{16}$. The sample was kept under argon for hydrogen uptake-release tests.

The $KC_{16}$ composition was subjected to TGA under flowing hydrogen in an experiment like that described in Example 1. The temperature of the sample was slowly increased (10° C./min.) to 290° C. with a concomitant increase in sample weight (curve 30) to a maximum of more than 13% at about 205 degrees. This weight increase is attributable to a hydrogen uptake of that amount. A first cooling and heating cycle (curves 32 and 34) and second (curves 36 and 38) and third cooling and heating cycles (curves 40 and 42) again demonstrated the capability of this potassium intercalated graphite, $KC_{16}$, to adsorb and release appreciable amounts of hydrogen gas. As seen, the sample adsorbed over 18% of its weight of hydrogen and released more than half of that hydrogen under the conditions of this example.

Additional general comments may be made about the above alkali metal intercalated graphite samples. The color of the samples ranged from dark copper to yellowish gold. At higher concentrations of potassium, the color was yellowish gold and at lower potassium concentrations the color becomes dark copper.

X-ray diffraction analyses showed single phase compounds when $KC_8$ was made. No diffraction lines of graphite or potassium were observed in the samples. However, when concentration of potassium was reduced from $KC_8$ to $KC_{16}$, mixed phases of $KC_8$ and other phases of intercalated graphite material were formed.

Other interesting properties of the intercalated materials produced by the method aspect of this invention have been noted. The graphite material intercalated with potassium as produced in the above examples were shown to expel a magnetic field at temperatures above room temperature. In fact, the expulsion of the magnetic field was observed at 300° C. Samples with stored hydrogen experienced a weight loss when placed in a magnetic field. The observation of these phenomena suggest the presence of very interesting conductivity properties in the materials produced in accordance with this invention.

While the above examples have illustrated the practice of the invention with potassium intercalated graphite compositions, the invention may likewise be practiced using lithium or sodium as the alkali metal ingredient. Further, mixtures of the metals may be used. As stated above, when lithium is the alkali metal, it is preferred that the reactants be mixed in proportions of six to twelve atoms of carbon per atom of lithium. For sodium the preferred ratio is eight to twelve carbon atoms per sodium atom and for potassium the atomic ratio is eight to 24 carbon atoms. When mixtures of metals are used, the ratios are modified in proportion to the amounts of the respective metals.

Useful hydrogen storage compositions may be made by a one-step intercalation of the carbon with the alkali metal to the preferred atomic proportions. However, it is much preferred to first prepare a graphite-rich composition that has been intercalated with a relatively small amount of the alkali metal as demonstrated in the above specific illustrative examples. Precursors with a carbon-to-alkali metal atomic ratio of about 30 or higher provide a starting material that yields excellent hydrogen storage compositions upon further intercalation.

Also, as stated above, suitable non-graphitic carbons may be employed to make useful hydrogen storage compositions, but graphitic carbons are preferred.

While the invention has been described with reference to preferred embodiments, other forms of the invention could readily be adapted by those skilled in the art. Accordingly, the invention is to be considered limited only by the scope of the following claims.

What is claimed is:

1. A method of making an alkali metal-carbon composition, said method comprising
    preparing a precursor mixture comprising a carbon material including graphite carbon, and one or more alkali metals selected from the group consisting of lithium, sodium and potassium in the atomic proportion of one part of said alkali metal to more than twenty-four parts carbon under an atmosphere that is substantially inert to said alkali metal,
    reacting said precursor mixture under such an atmosphere and at a temperature and pressure to form a precursor product comprising layers of carbon atoms with intercalated alkali metal atoms,
    treating said precursor product with alcohol to remove any unreacted alkali metal,
    preparing a second mixture comprising an additional amount of said one or more alkali metals, and said precursor product under an atmosphere that is substantially inert to said alkali metal, the amount of said additional metal being sufficient to reduce the atomic proportion of carbon to alkali metal to a value in the range of six to twenty-four parts carbon, and
    reacting said second mixture under such an atmosphere to form a reaction product comprising layers of carbon atoms with intercalated alkali metal atoms and further characterized by an absence of x-ray diffraction maxima for said carbon and said alkali metal.

2. A method as recited in claim 1 wherein the carbon material consists essentially of graphitic carbon.

3. A method of making an alkali metal-carbon composition, said method comprising
    preparing a precursor mixture comprising a carbon material including graphite carbon, and one or more alkali metals selected from the group consisting of lithium, sodium and potassium under an atmosphere that is substantially inert to said alkali metal, the amount of said carbon material exceeding, on an atomic ratio basis, twelve parts of carbon per atom of lithium or sodium and twenty-four parts of carbon per atom of potassium,
    reacting said precursor mixture under such an atmosphere and at a temperature and pressure to form a precursor product comprising layers of carbon atoms with intercalated alkali metal atoms, treating said precursor product with alcohol to remove any unreacted alkali metal, preparing a second mixture comprising an additional amount of said one or more alkali metals, and said precursor product under an atmosphere that is substantially inert to said alkali metal, the amount of said additional metal being sufficient to reduce the atomic proportion of carbon to alkali metal to a value in the range of six to twelve parts carbon per atom of lithium or sodium and eight to twenty-four parts of carbon per potassium atom, and reacting said second mixture under such an atmosphere to form a reaction product comprising layers of carbon atoms with intercalated alkali metal atoms and further characterized by an absence of x-ray diffraction maxima for said carbon and said alkali metal.

4. A method as recited in claim 3 wherein the carbon material consists essentially of graphitic carbon.

* * * * *